Feb. 12, 1935. J. P. WATSON 1,990,577
MEANS FOR DETERMINING FUZE AND OTHER VALVES FOR
USE IN CONNECTION WITH ANTIAIRCRAFT GUNS
Filed May 17, 1932 2 Sheets-Sheet 1
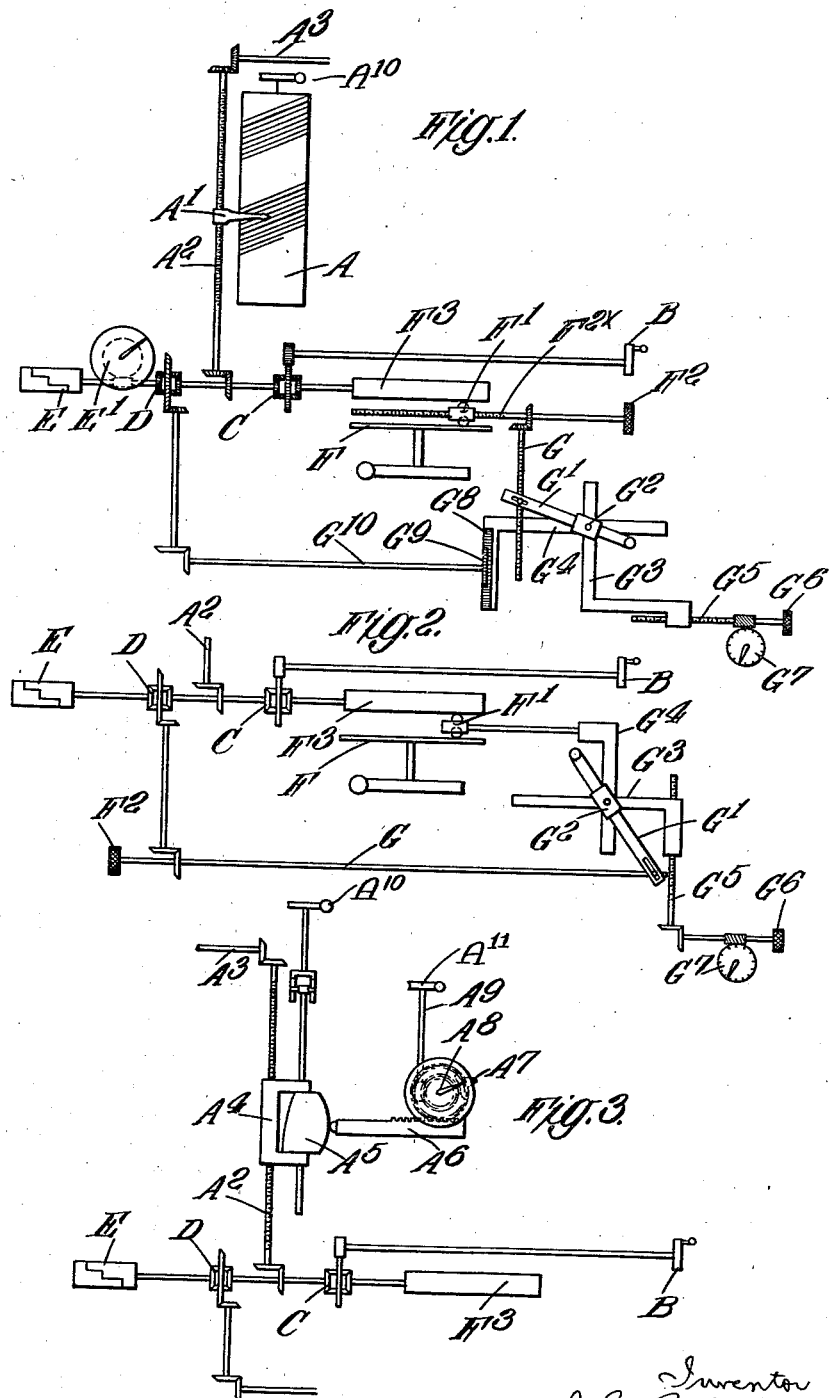

Feb. 12, 1935. J. P. WATSON 1,990,577
MEANS FOR DETERMINING FUZE AND OTHER VALVES FOR
USE IN CONNECTION WITH ANTIAIRCRAFT GUNS
Filed May 17, 1932 2 Sheets-Sheet 2
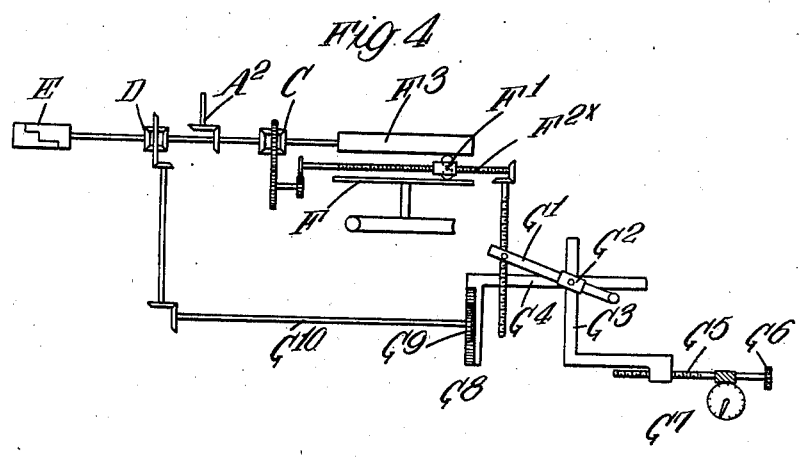
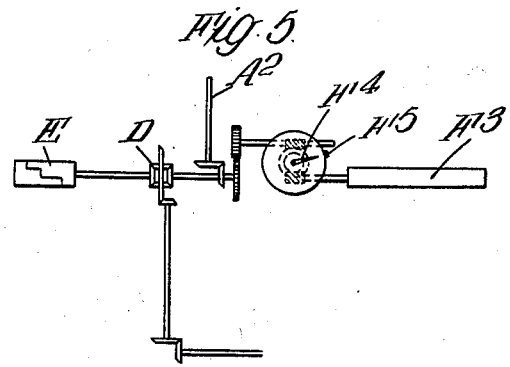

Patented Feb. 12, 1935

1,990,577

UNITED STATES PATENT OFFICE 1,990,577

MEANS FOR DETERMINING FUZE AND OTHER VALUES FOR USE IN CONNECTION WITH ANTIAIRCRAFT GUNS

John Percival Watson, Westminster, England, assignor to Vickers-Armstrongs Limited, London, England, a British company Application May 17, 1932, Serial No. 611,873
In Great Britain June 6, 1931

12 Claims. (Cl. 235—61.5)

This invention relates to means for determining fuze or other values such as time of flight, or tangent elevation for gunnery purposes.

According to the invention the indicator or the transmitter (or both) for such values is operated in accordance with the sum of the "kept" value (i. e. the sum of the initial value and the changes in such value due to the movement of the target) and the value for dead time obtained from a device comprising a member adjustable in accordance with the dead or elapsed time and another member set for the correct rate of change in the value. The last-mentioned member is preferably operated by the movement given to the adjustable element of a variable speed gear the driven element of which is rotated in accordance with the actual changes in the said value. The said sum of the initial value and the change in the value may be obtained by means of a device which is manually adjustable in accordance with the initial value and is operated by the driven element of the variable speed gear to follow the changes in the value by manually adjusting the adjustable element of the variable speed gear. Alternatively the said sum may be obtained from a source external to the apparatus forming the subject of the present invention in which case the adjustable element of the variable speed gear is adjusted either automatically or by hand in order to cause the driven element of this gear to rotate at a speed corresponding to the change in the value of the sum (i. e. the kept value) obtained from the said external source.

The dead or elapsed time above referred to is the time which elapses between the setting of the fuze and the firing of the projectile or the time which elapses between the production and the utilization of any of the other functions or values.

In order that the said invention may be clearly understood and readily carried into effect, the same will now be described more fully with reference to the accompanying drawings in which:—

Figures 1 to 5 are diagrams illustrating five different forms of apparatus in accordance with this invention.

For convenience of description the different forms of apparatus will be described as being intended for determining fuze values although it is to be understood that all the said forms can be used for determining the values of other functions such as time of flight of projectile or tangent elevation as aforesaid.

Referring first to Figure 1, A is a height-fuze chart which is rotated by suitable means including gears $A^{10}$ in accordance with the exteriorly determined future angle of sight of the target (i. e. the present angle of sight ± the vertical deflection) and over which moves a pointer $A'$ carried by a screw-threaded shaft $A^2$; the travel of this pointer in keeping it on a given height curve is proportional to the fuze value. An initial fuze setting handwheel B is connected through a differential gear C (hereinafter referred to) to the said pointer $A'$ and through another differential gear D (also hereinafter referred to) to the fuze transmitter E and indicator $E'$. Rotation of this handwheel B sets the pointer on to the height curve corresponding to the ascertained height and rotates the transmitter and the indicator in accordance with the initial fuze value, that is to say the fuze value corresponding to the initial future angle of sight and the ascertained height. The said pointer is maintained on the appropriate height curve during the rotation of the height-fuze chart for varying angles of sight due to the movement of the target, by means of a power driven variable speed device comprising a disc F driven by a suitable motor at a constant speed, a ball carriage $F'$ adjustable radially by means of a milled head or a handwheel $F^2$ through the intermediary of a screw-threaded shaft $F^{2x}$, and a roller $F^3$ which is driven from the said disc through the balls of the ball carriage at a variable speed depending upon the adjustment given to the ball carriage, the said roller driving the shaft $A^2$ and therefore the pointer $A'$ through the first-mentioned differential gear C. Thus by suitably adjusting the ball carriage the pointer can be caused to travel at the correct speed to follow the required height curve and the rotation of the shaft $A^2$ is therefore proportional to the kept fuze value. The shaft $A^2$ drives another shaft $A^3$ by which any suitable device can be operated in accordance with the kept fuze value. At the same time the variable speed device gives additional rotation to the fuze transmitter and indicator for the required change of fuze value and the said transmitter and indicator are thus rotated in accordance with the sum of the initial fuze value and the change of the fuze value, i. e. in accordance with the kept fuze value. The rotation of the said milled head $F^2$ also operates a screw-threaded shaft G engaging in a nut carried by a radius bar $G'$ which is thus adjusted in accordance with the rate of change of the fuze value and mounted on this radius bar there is a block $G^2$ connected to two sliding members $G^3$, $G^4$ disposed at right angles to each other. The sliding member $G^3$ is moved by a screw-threaded shaft $G^5$ operated by a suitable milled head or handwheel $G^6$ in accordance with the aforesaid dead time the amount of which is indicated on a dial $G^7$. The arrangement is such that the consequent movement of the second sliding member $G^4$ is proportional to the product of the two variables viz., rate of change of fuze value and dead time. This second sliding member carries a rack $G^8$ which engages with a pinion $G^9$ carried by a shaft $G^{10}$ the movement of which is imparted to the aforesaid second-mentioned differential gear D through this movement proportional to the product of rate of change of fuze value and dead time is super-imposed upon the movement of the transmitter E and indicator E'. Thus the three fuze settings (i. e. initial fuze, change of fuze and dead time fuze) are added together and the transmitter and indicator rotated for the total fuze value.

In the modified construction according to Figure 2 the rate of change milled head $F^2$ operates the screw-threaded shaft G of Figure 1 and also the differential gear D, and the ball carriage F' is adjusted by the resultant member $G^4$ of the mechanism G', $G^2$, $G^3$, $G^4$ of Figure 1. The parts $G^8$, $G^9$ and $G^{10}$ of Figure 1 are not used in Figure 2.

In the alternative construction according to Figure 3 the height-fuze chart A and its associated pointer A' are replaced by the cam gear shown. In this alternative the screw-threaded shaft $A^2$ displaces a frame $A^4$ carrying a suitably shaped cam $A^5$ which is rotated by suitable means including gears $A^{10}$ in accordance with the exteriorly determined future angle of sight. The said cam operates a rack $A^6$ which drives a pointer $A^7$ arranged to move co-axially with respect to another pointer $A^8$ driven by suitable means including gears $A^{11}$ and shaft $A^9$ in accordance with the exteriorly determined changing height of the target. Alternatively the cam $A^5$ can be rotated in accordance with the changing height and the shaft $A^9$ rotated in accordance with the future angle of sight. The handwheel B is initially adjusted to bring the pointer $A^7$ into co-incidence with the pointer $A^8$ thereby effecting the setting for the initial fuze value, after which the ball carriage of the variable speed gear is operated as in Figure 1 or Figure 2 to maintain the pointers in co-incidence, thereby effecting the further movement of the transmitter E in accordance with the change in the fuze value. The adjustment of the transmitter for the dead time fuze value may be effected as in Figure 1 or Figure 2.

In the construction according to Figure 4 the shaft $A^2$ is driven from an external source in accordance with the ascertained kept fuze values and is not used to set a pointer following a curve as in Figure 1, and the handwheel B and the knob $F^2$ of the preceding figures are not used, the third member of the differential gear C being operated by the screw-threaded shaft $F^{2x}$ that adjusts the ball carriage F'. Thus any difference between the speeds of rotation of the other two members of the said differential gear automatically effects the necessary adjustment of the ball carrier until the said two members are moving at the same speed. The shaft $F^{2x}$ of the ball carriage operates the radius bar G' in a similar manner to that described with reference to Figure 1.

In the construction shown by Figure 5 considerations similar to those of Figure 4 apply, but instead of the ball carriage F' being adjusted automatically it is adjusted by hand (as shown in Figure 1 or Figure 2) until a pointer $F^4$ driven by the roller $F^3$ moves at the same rate as a pointer $F^5$ driven by the shaft $A^2$, at which time the adjustment that has been given to the ball carriage is a measure of the rate of change of fuze value and the radius bar G' of Figure 1 or the member $G^4$ of Figure 2 is set accordingly. Instead of two pointers $F^4$ and $F^5$ a balanced pointer (i. e. a pointer operated through a differential gear controlled by the roller $F^2$ and the shaft $A^2$) may be used.

If any of the above described constructions are to be used for determining other functions such as time of flight or tangent elevation, the mechanism would be devised or constructed to suit the required function.

What I claim and desire to secure by Letters Patent of the United States is:—

1. Apparatus for determining fuze values for gunnery purposes, the combination of means adjustable in accordance with the initial fuze value, means adjustable in accordance with the rate of change of the fuze value, a variable speed device adjustable by said last named means, means adjustable in accordance with the fuze dead time, mechanism jointly operated by said first and third means and said device for combining their movements, and an indicator actuated by said mechanism.

2. Apparatus for determining fuze values for use in gunnery, the combination of a means adjustable in accordance with the initial fuze value, a member adjustable in accordance with the fuze dead time, a member settable in accordance with the rate of change of the fuze value, mechanism jointly actuated by said members for combining the movements thereof, and means jointly operated by the first named means and the mechanism for combining the movements thereof, and an indicator actuated by the last named means.

3. Apparatus for determining fuze values for use in gunnery, the combination of a variable speed device, having a variable driven part, an adjustable part and a part driven at constant speed, means for adjusting the adjustable part in accordance with the rate of change of the fuze value, initial adjustment means adjustable in accordance with the initial fuze value, mechanism jointly operated by the variable part of the variable speed device and by the initial adjustment means whereby the movements of the variable part are combined with the movements of said initial adjustment means, means adjustable in accordance with the dead fuze time, mechanism jointly operated by the first and last means, and an indicator jointly operated by the mechanism.

4. Apparatus for determining fuze values for use in gunnery, the combination of a variable speed device, having a variable driven part, an adjustable part and a part driven at constant speed, means for adjusting the adjustable part in accordance with the rate of change of the fuze value, initial adjustment means adjustable in accordance with the initial fuze value, mechanism jointly operated by the variable part of the variable speed device and by the initial adjustment means whereby the movements of the variable part are combined with the movements of said initial adjustment means, a sliding linkage having a link driven by the first-named means and another cooperating link, means adjustable in accordance with fuze dead time connected to the said other link, and operative connections between the linkage and the mechanism for varying the movement of the latter, and an indicator actuated by the mechanism.

5. Apparatus for determining a variable value for use in gunnery comprising a variable speed device having a constant speed part, a variable speed part, and an adjustable part transmitting drive from the constant speed part to the variable speed part; a kept value member driven in accordance with the kept value; a member connected both to the kept value member and to the variable speed part, so that when the adjustable part is adjusted to cause the variable speed part to be driven at the kept value said adjustable part will measure the rate of change variation occurring in the kept value; a dead time indicator; adjusting means for adjusting the dead time indicator; means for multiplying the movements of the adjusting means by the movements of the adjustable part; an indicating means; and means for adding the product of the multiplying means to the movements of the variable speed part and imparting the sum of these movements to the indicating means.

6. Apparatus for determining a variable value for use in gunnery comprising a variable speed device having a constant speed part, a variable speed part, and an adjustable part transmitting drive from the constant speed part to the variable speed part; a kept value indicating device continuously indicating variations in the kept value of said variable value; an indicating means; an initial adjustment device for said indicating means; adding means which adds the movements of the initial adjustment means to the movements of the said variable speed part; means cooperating with the kept value indicating device and driven by said adding means in accordance with the sum of said movements, said cooperating means being maintained at the required position and speed in relation to the kept value indicating means by adjustment of the initial adjustment means and of the said adjustable part whereby the latter measures the rate of change of the variable value; a dead time indicator; adjusting means for adjusting the dead time indicator; means for multiplying the movements of the adjusting means by the movements of said adjustable part; and means for adding the product of the multiplying means to the movements of the initial adjustment device and of the variable speed part and imparting all three movements to the indicating means.

7. Apparatus for determining a variable value for use in gunnery comprising a variable speed device having a constant speed part, a variable speed part, and an adjustable part transmitting drive from the constant speed part to the variable speed part; a kept value indicating device continuously indicating variations in the kept value of said variable value; means cooperating with the kept value indicating device and driven by the variable speed part at the required rate in relation to the kept value indicating means by adjustment of said adjustable part whereby the latter measures the rate of change of the kept value; a dead time indicator; adjusting means for adjusting the dead time indicator; means for multiplying the movements of the adjusting means by the movements of said adjustable part; an indicating means; and means for adding the product of the multiplying means to the movements of the variable speed part and imparting the sum of these movements to the indicating means.

8. Apparatus for determining a variable value for use in gunnery comprising a variable speed device having a constant speed part, a variable speed part, and an adjustable part transmitting drive from the constant speed part to the variable speed part; a hand operable control member connected to said adjustable part and comprising the sole means for adjusting said part; a kept value indicating device continuously indicating variations in the kept value of said variable value; an indicating means; an initial adjustment device for said indicating means; adding means which adds the movements of the initial adjustment means to the movements of the said variable speed part; means cooperating with the kept value indicating device and driven by said adding means in accordance with the sum of said movements, said cooperating means being maintained at the required position and speed in relation to the kept value indicating means by adjustment of the initial adjustment means and of the said adjustable part whereby the latter measures the rate of change of the variable value; a dead time indicator; adjusting means for adjusting the dead time indicator; means for multiplying the movements of the adjusting means by the movements of said adjustable part; and means for adding the product of the multiplying means to the movements of the initial adjustment device and of the variable speed part and imparting all three movements to the indicating means.

9. Apparatus for determining a variable value for use in gunnery comprising a variable speed device having a constant speed part, a variable speed part, and an adjustable part transmitting drive from the constant speed part to the variable speed part; a member continuously driven in accordance with the kept value of said variable value; means for subtracting the movements of the continuously driven member from the movements of the variable speed part and adjusting the adjustable part in accordance with the difference whereby said adjustable part automatically measures the rate of change of the kept value; a dead time indicator; adjusting means for adjusting the dead time indicator; means for multiplying the movements of the adjusting means by the movements of said adjustable part; an indicating means; and means for adding the product of the multiplying means to the movements of the continuously driven member and for operating the indicating means in accordance with the sum thereof.

10. Apparatus for determining a variable value for gunnery purposes comprising an indicator for indicating said value, driving means for adjusting the indicator by continuous drive, means for ascertaining the changes in said value due to movement of the target, means for adjusting said driving means to vary the rate of drive according to the said ascertained changes, an element which is adjusted according to the rate of said drive, a dead time indicating device, an element adjustable according to dead time and operatively connected to said device, a multiplying mechanism adjusted by both said elements whereby the said multiplying mechanism multiplies the said rate of drive by the dead time adjustment, a member movable according to the product produced by said mechanism, means for adding said product to the said continuous drive by combining the movements of said member with the movements of the driving means, an indicator, and means for imparting the combined movement of said member and of the driving means to the indicator, whereby the indicator is actuated solely according to the amount of the kept value and the product referred to.

11. Apparatus for determining a variable value for gunnery purposes comprising an indicator for indicating said value, driving means for adjusting the indicator by a continuous drive, means for ascertaining the changes in said value due to movement of the target, means for adjusting said driving means to vary the rate of drive according to the said ascertained changes, an element which is adjusted according to the rate of said drive, a dead time indicating device, an element adjustable according to dead time and operatively connected to said device, a multiplying mechanism adjusted by both said elements whereby the said multiplying mechanism multiplies the said rate of drive by the dead time adjustment, a member movable according to the product produced by said mechanism, means for adding the said product to the said continuous drive by combining the movements of said member with the movements of the driving means, initial adjustment means to be moved according to the initial value of said variable value and operatively connected to the means for ascertaining said changes, and means for adding the said initial value to the said changes in said value and to said product by combining the movements of said initial adjustment means with the movements of said driving means; the indicator being operated solely according to the three factors (1) initial value, (2) changes in the value due to the movements of the target, and (3) product of dead time and rate of said changes in value.

12. Apparatus as in claim 10 wherein the driving means comprise a member driven at constant speed, a variable speed member driven from the said constantly driven member, and the movements of which variable speed member are transmitted to the indicator, and adjustable means for transmitting drive from the constantly driven member to the variable speed member, and wherein said adjustable transmitting means comprises the element which is adjusted according to the rate of drive.

JOHN PERCIVAL WATSON.